US010425431B2

(12) United States Patent
Espes et al.

(10) Patent No.: US 10,425,431 B2
(45) Date of Patent: Sep. 24, 2019

(54) METHOD FOR PROCESSING AN INTRUSION INTO A WIRELESS COMMUNICATION NETWORK, RELATED DEVICE AND COMPUTER PROGRAM

(71) Applicants: B<>COM, Cesson Sevigne (FR); Universite de Bretagne Occidentale, Brest (FR); Institut Mines Telecom, Paris (FR)

(72) Inventors: David Espes, Plabennec (FR); Nora Cuppens, Liffre (FR)

(73) Assignees: B<>COM, Cesson Sevigne (FR); UNIVERSITE DE BRETAGNE OCCIDENTALE, Brest (FR); INSTITUT MINES TELECOM, Paris (FR)

( * ) Notice: Subject to any disclaimer, the term of this patent is extended or adjusted under 35 U.S.C. 154(b) by 135 days.

(21) Appl. No.: 15/516,577

(22) PCT Filed: Sep. 30, 2015

(86) PCT No.: PCT/FR2015/052619
§ 371 (c)(1),
(2) Date: Apr. 3, 2017

(87) PCT Pub. No.: WO2016/051090
PCT Pub. Date: Apr. 7, 2016

(65) Prior Publication Data
US 2017/0302688 A1  Oct. 19, 2017

(30) Foreign Application Priority Data

Oct. 1, 2014 (FR) .................................... 14 59379

(51) Int. Cl.
*H04L 29/00* (2006.01)
*H04L 29/06* (2006.01)
(Continued)

(52) U.S. Cl.
CPC .......... *H04L 63/1416* (2013.01); *H04L 63/14* (2013.01); *H04W 12/12* (2013.01);
(Continued)

(58) Field of Classification Search
CPC ..... H04W 12/12; H04W 88/10; H04W 84/18; H04L 63/14; H04L 63/1416; H04L 2463/146; H04L 63/1441; H04L 9/006
See application file for complete search history.

(56) References Cited

U.S. PATENT DOCUMENTS

2002/0075870 A1* 6/2002 de Azevedo ............ H04L 67/16
370/390
2005/0273628 A1* 12/2005 Onischuk ........... G07D 11/0066
713/186
(Continued)

FOREIGN PATENT DOCUMENTS

CN  101820619 A  9/2010

OTHER PUBLICATIONS

International Search Report dated Jan. 8, 2016 for corresponding International Application No. PCT/FR2015/052619, filed Sep. 30, 2015.
(Continued)

Primary Examiner — Don G Zhao
(74) Attorney, Agent, or Firm — David D. Brush; Westman, Champlin & Koehler, P.A.

(57) ABSTRACT

A method for processing an intrusion in a communication network including a plurality of node equipment, including a current node, which: discovers of a neighborhood of the current node, including assigning a resilience group to the neighboring node, according to at least one piece of information representative of a resilience level of the neighboring node to at least one type of attack; detecting an intrusion affecting at least one suspect node of the neighborhood of
(Continued)

Figure 1:
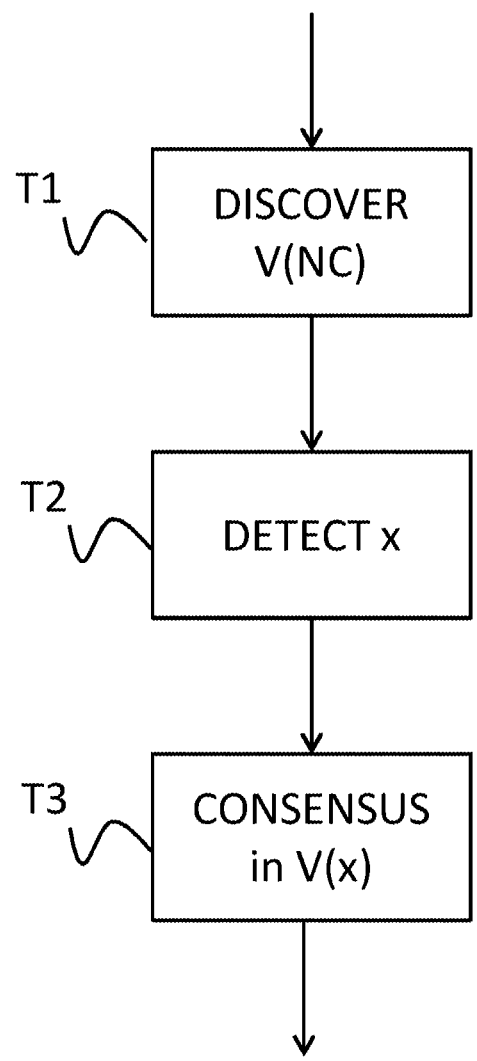

the current node; establishing a consensus concerning the at least one suspect node in a neighborhood by counting a number of resilience groups having detected the intrusion in the neighborhood of the suspect node and a total number of resilience groups represented in the neighborhood of the suspect node; and deciding to change a status of the suspect node based on a result of the consensus by comparison of both numbers.

12 Claims, 10 Drawing Sheets

(51) Int. Cl.
*H04W 12/12* (2009.01)
*H04W 88/10* (2009.01)
*H04W 84/18* (2009.01)
*H04L 9/00* (2006.01)

(52) U.S. Cl.
CPC .............. *H04W 88/10* (2013.01); *H04L 9/006* (2013.01); *H04L 63/1441* (2013.01); *H04L 2463/146* (2013.01); *H04W 84/18* (2013.01)

(56) References Cited

U.S. PATENT DOCUMENTS

| | | | |
|---|---|---|---|
| 2005/0278178 A1* | 12/2005 | Girouard | G06F 21/552 704/270 |
| 2008/0140795 A1* | 6/2008 | He | H04L 63/1416 709/207 |
| 2013/0086268 A1* | 4/2013 | Sloma | G06F 9/455 709/226 |
| 2014/0101223 A1* | 4/2014 | Cosham | H04L 67/10 709/202 |
| 2016/0117505 A1* | 4/2016 | Chow | G06F 21/552 726/22 |

OTHER PUBLICATIONS

Riaz Ahmed Shaikh et al., "Trusting Anomaly and Intrusion Claims for Cooperative Distributed Intrusion Detection Schemes of Wireless Sensor Networks", Young Computer Scientists, 2008, ICYCS 2008, The 9th International Conference for, IEEE, Piscataway, NJ, USA, Nov. 18, 2008 (Nov. 18, 2008), pp. 2038-2043, XP031373484.
Frederic Cuppens et al., "Property Based Intrusion Detection to Secure OLSR", Wireless and Mobile Communications , 2007, ICWMC '07, Third International Conference on, IEEE, PI, Mar. 1, 2007 (Mar. 1, 2007), pp. 52-52, XP031065973.
French Search Report and Written Opinion dated Aug. 12, 2015 for corresponding French Application No. 1459379, filed Oct. 1, 2014.
Ioannis Krontiris et al., "Cooperative Intrusion Detection in Wireless Sensor Networks", published in the proceedings of the conference EWSN 2009, pp. 263-278.
English translation of the Written Opinion of the international searching authority dated Jan. 8, 2016 for corresponding International Application No. PCT/FR2015/052619, filed Sep. 30, 2015.

* cited by examiner

FIG. 1 (AA)

METHOD FOR PROCESSING AN INTRUSION INTO A WIRELESS COMMUNICATION NETWORK, RELATED DEVICE AND COMPUTER PROGRAM

1. CROSS-REFERENCE TO RELATED APPLICATIONS

This Application is a Section 371 National Stage Application of International Application No. PCT/FR2015/052619, filed Sep. 30, 2015, the content of which is incorporated herein by reference in its entirety, and published as WO 2016/051090 on Apr. 7, 2016, not in English.

2. FIELD OF THE INVENTION

The field of the invention is that of communication networks comprising a plurality of nodes, implementing an intrusion processing technique distributed between neighbouring nodes.

The invention may in particular, but not exclusively, apply to sensor networks or to the Internet of Things (for IoT) or, more generally, to any type of communication network.

3. DESCRIPTION OF THE STATE OF THE ART

In the Internet of Things, equipment generally have limited resources in terms of hardware (processor, memory, . . . ) as well as energy. These mainly battery-operated equipment with a limited operating time cannot listen permanently to the network to detect possible attacks. Indeed, it is subjected to alternating awake and sleep periods in order to preserve its battery as well as possible. The intrusion detection mechanisms must therefore take these constraints into account and, in fact, are often distributed over all the nodes. In order to determine if a node makes a slip-up, some nodes thus listen for a given period of time the messages exchanged by their neighbours and analyse them in order to detect an attack.

In this context, a single node is not sufficient to detect that an attack is taking place. Indeed, a node i can be corrupted and announce that it has just detected that a node j has just committed an attack while the latter is in no way compromised. The possible compromise of certain nodes does not therefore make it possible to affirm that an alert raised by a node is real. Indeed, a compromised node has every interest in participating in the intrusion detection mechanism in order to create false-positive results and thus to isolate certain nodes from the operation of the network. A node can thus carry out particularly discrete attacks by making believe that these neighbours are compromised and can therefore direct the traffic towards it. To reduce the impact of compromised nodes, a consensus can be found between neighbouring nodes. If a certain number of nodes detects, at the same time, an attack, it can be admitted that it has indeed taken place. A consensus is therefore established to reduce the impact of compromised nodes.

We know from the article by Krontiris et al, entitled "*Cooperative Intrusion Detection in Wireless Sensor Networks*", published in the proceedings of the conference EWSN 2009, pp 263-278, an intrusion processing technique according to which neighbouring nodes of a wireless network cooperate to identify a malicious node.

In relation to FIG. 1, a node of the network discovers its vicinity in a step T1. In T2, it locally detects a suspect node, alerts its neighbours and receives alert messages from its neighbours. In T3, it implements a voting mechanism between neighbours, also called consensus, based on the alert messages it has received. If a node is suspected by the majority of nodes alerted in its neighbourhood, it is then considered as compromised and it is decided to isolate it.

4. SHORTCOMINGS OF THE PRIOR ART

A shortcoming of this method is that all nodes in the neighbourhood have the same weight in the voting mechanism. The resulting risk is that several nodes of this neighbourhood sensitive to the same security flaw are compromised at the same time and modify the result of the consensus in favour of the attacker.

5. SUMMARY OF THE INVENTION

An exemplary aspect of the present disclosure relates to a method for processing an intrusion in a communication network comprising a plurality of node equipment, said method comprising the following steps, implemented by a said node equipment, called current node:
  Discovery of a neighbourhood of the current node;
  Detection of an intrusion affecting at least one suspect node of the neighbourhood of the current node;
  Establishment of a consensus affecting at least one suspect node in a neighbourhood of the suspect node;
  Decision to change the status of the suspect node based on the result of the consensus.
According to the invention:
  the discovery of a neighbourhood comprises a step of receiving announcement messages coming from neighbouring nodes of the current node, an announcement message comprising at least one identifier of the neighbouring node and at least one piece of information representative of a resilience level of the neighbouring node to at least one type of intrusion and a step of assigning a group of resilience to the neighbouring node, based on at least one piece of information;
  establishing a consensus counts a number of resilience groups having detected the intrusion in the neighbourhood of the suspect node and a total number of resilience groups represented in the neighbourhood of the suspect node;
  the decision to change the status of the suspect node takes into account a comparison of the number of resilience groups having detected the intrusion in the neighbourhood of the suspect node with respect to the total number of resiliency groups represented in the neighbourhood of the suspect node.

With the invention, the nodes of a communication network are grouped based on their resilience level to one or more types of intrusions.

Upon the discovery of a neighbouring node, the current node assigns to said node a group among a set of determined resilience groups, based on the information received in the announcement message broadcast by this neighbouring node.

In the event of an intrusion detection, the current node implements a group consensus with the neighbours of the suspect node according to a voting mechanism that counts one vote per group represented in the neighbourhood participating in the consensus.

According to the invention, the neighbourhood of the suspect node is therefore divided into disjoint subsets, each representing a predetermined resilience group, each of these subsets contributing to the vote, on the basis of one subset one vote.

Following a decision to change the status of the suspect node arising from the group consensus proposed by the invention, a node considered "normal" or "reliable" may switch to the "corrupt" status, which triggers a protection action at the current node, such as isolating it or degrading its reputation.

Thus, the invention relies on an entirely novel and inventive approach to intrusion processing in a communication network, which takes into account the sensitivity of a group of nodes to security flaws in the consensus mechanism.

Unlike the prior art which grants a vote to each node participating in the consensus mechanism, the invention proposes to take advantage of the heterogeneity of the network in order to increase its resilience to attacks. Indeed, even if it has found a security flaw for a group of nodes and corrupted this group, an attacker will influence the consensus only by a single vote, attributed to the subset of the neighbourhood of the suspect node belonging to the corrupt group. The invention therefore obliges this attacker to deploy additional resources to find other attacks and to corrupt other groups of nodes in order to tilt the consensus in its favour.

Indeed, in the case of the prior art, an attacker only needed to corrupt half the nodes participating in a consensus to make sure that it will toggle. Moreover, once it has found a security flaw for a set of nodes, it could corrupt all of these nodes with the same type of attack.

With the invention, the toggle threshold of the consensus can be considerably increased.

In addition, establishing consensus by group has another advantage, that of diversifying the intrusion detection methods. Using a different method per group, each method will have an equivalent weight in the consensus mechanism. Thus, the detection of false-positive results by one method will be compensated by another method.

The invention is also particularly well adapted to communication networks comprising energy-constrained nodes, alternating short awake periods and long sleep periods. Indeed, with the consensus mechanism of the invention, the number of corrupted nodes no longer matters, it is the number of groups of corrupted nodes that is relevant. It is therefore possible to have a large number of nodes in sleep period in each group without penalizing the resilience of the consensus. In other words, the invention makes it possible to defuse attacks of the "forced awakening" type, which place the corrupted nodes in a state of permanent awakening so that their vote weighs more in a consensus mechanism.

Finally, the invention makes it possible to significantly increase the reactivity of the communication network when taking into account a new type of attack or a new security flaw. Indeed, following a group decision leading to assigning the status of a corrupt node to a suspect node, the knowledge of the resilience group to which this node belongs can advantageously be exploited to take measures of protection of greater magnitude, consisting at least provisionally in excluding the nodes of the concerned resilience group from the next group consensus.

According to an advantageous characteristic of the invention, said at least one piece of information representative of a resilience level of the node adjacent to at least one type of intrusion, comprises a resilience group identifier.

The resilience groups are determined beforehand, for example by an administrator device, a collector device or a trusted authority, and then transmitted to the node equipment. A first advantage of this solution is that it is simple and resource-efficient for the node equipment. A second advantage is that it allows the nodes to exchange identifiers of resilience groups shared by all during the discovery of their respective neighborhoods.

According to an advantageous characteristic of the invention, said at least one piece of information representing a resilience level of the neighbouring node comprises at least one characteristic representative of a hardware or software configuration of this node and the discovery step comprises, following the reception of announcement messages from neighbouring nodes, defining resilience groups from the characteristics received.

A first advantage is that the current node determines the resilience groups represented in its neighbourhood autonomously from the characteristics that it receives in the announcement messages. A second advantage of this solution is to reduce the signalling traffic between the nodes and an administrator equipment.

According to another aspect of the invention, the method comprises a prior step of obtaining said at least one piece of information representative of a resilience level of the current node originating from a trusted authority.

An advantage is that the information representative of a resilience level of a node is trustworthy and that the constitution of the resilience groups cannot be modified by an attacker. The trusted authority may be endorsed, for example, by an administrator equipment of the communication network or by a collector device, arranged to collect measurement information returned by a plurality of sensor node equipments.

According to another aspect of the invention, the step of obtaining comprises receiving a message comprising said at least one piece of information, said message comprising a digital signature of the trusted authority, and verifying the digital signature from a public key of the trusted authority.

An advantage of the digital signature is that it enables the integrity of the entity that has sent the message comprising the information representative of a resilience level of the destination node.

According to another aspect of the invention, the discovery of a neighbourhood of the current node comprises updating a neighbouring table comprising one entry per neighbouring node, said entry comprising at least one identifier of the neighbouring node and said at least one piece of information representative of a resilience level of the neighbouring node.

With the invention, the neighbours' table is enriched with the piece(s) of information which allow the node to define and constitute the resilience groups of neighbouring nodes, relevant for the establishment of the consensus.

According to another aspect of the invention, said entry further comprises an identifier of the group assigned to the neighbouring node by the current node.

An advantage is that the current node immediately has the group identifier to which a neighbouring node belongs.

According to another aspect of the invention, the nodes are organised into a plurality of clusters comprising member nodes, the current node acts as a cluster head and the method comprises:
  upon reception of an announcement message from a neighbouring node, a step of recording as a member node of the cluster of the current node;
  upon detection of an intrusion by a member node of the cluster, spreading an alert message to the head nodes of neighbouring cluster and reception of alert message from the head nodes of neighbouring clusters, one said alert message comprising at least one identifier of the suspect node, information representative of a resilience level of the member nodes of the cluster having detected the intrusion and information representative of a resilience level of the member nodes of the cluster which have not detected the intrusion;

once the decision has been made, transmission of a message spreading the decision at least to the member nodes of the cluster and of the head nodes of neighbouring clusters.

In the case of a hierarchical architecture, the node that acts as a cluster head is the node which establishes the group consensus and propagates its decision to the nodes of its cluster and the neighbouring cluster heads.

With the invention, in the event of detection of an intrusion, the current cluster i.e. the head node propagates to the neighbouring cluster head nodes the information representative of a resilience level of the members of its cluster having detected the suspect node in their neighbourhood and those of its cluster members not having detected the suspect node, so that they in turn have all the information to establish the group consensus and propagate the resulting decision in their own cluster.

The method which has just been described in its various embodiments is advantageously implemented by a device for processing an intrusion in a communication network comprising the following units:

Discovery of a neighbourhood of the current node;
Detection of an intrusion affecting at least one suspect node of the neighbourhood of the current node;
Establishment of a consensus affecting said at least one suspect node in a neighbourhood of the suspect node;
Decision relative to a change in status of the suspect node based on the result of the consensus;

According to the invention:

the discovery of a neighbourhood comprises a unit for receiving announcement messages coming from neighbouring nodes of the current node, an announcement message comprising at least one identifier of the neighbouring node and at least one piece of information representative of a resilience level of the neighbouring node to at least one type of intrusion and a unit for assigning a group of resilience to the neighbouring node, based on said at least one piece of information;

the unit establishing a consensus counts a number of resilience groups having detected the intrusion in the neighbourhood of the suspect node and a total number of resilience groups represented in the neighbourhood of the suspect node; and the decision to change the status of the suspect node takes into account a comparison of the number of resilience groups having detected the intrusion in the neighbourhood of the suspect node with respect to the total number of resiliency groups represented in the neighbourhood of the suspect node.

Correlatively, the invention also relates to a node equipment comprising the device for processing an intrusion according to the invention.

Correlatively, the invention also relates to a communication network comprising a plurality of node equipment according to the invention.

The invention also relates to a computer program comprising instructions for implementing the steps of a method for processing an intrusion as described above, when this program is executed by a processor.

This program can use any programming language. They can be downloaded from a communication network and/or recorded on a computer-readable medium.

Finally, the invention relates to recording media, readable by a processor, integrated or not integrated into the device for processing an intrusion according to the invention, possibly removable, respectively storing a computer program implementing a method for processing an intrusion, as described above.

6. LIST OF FIGURES

Figure 2:
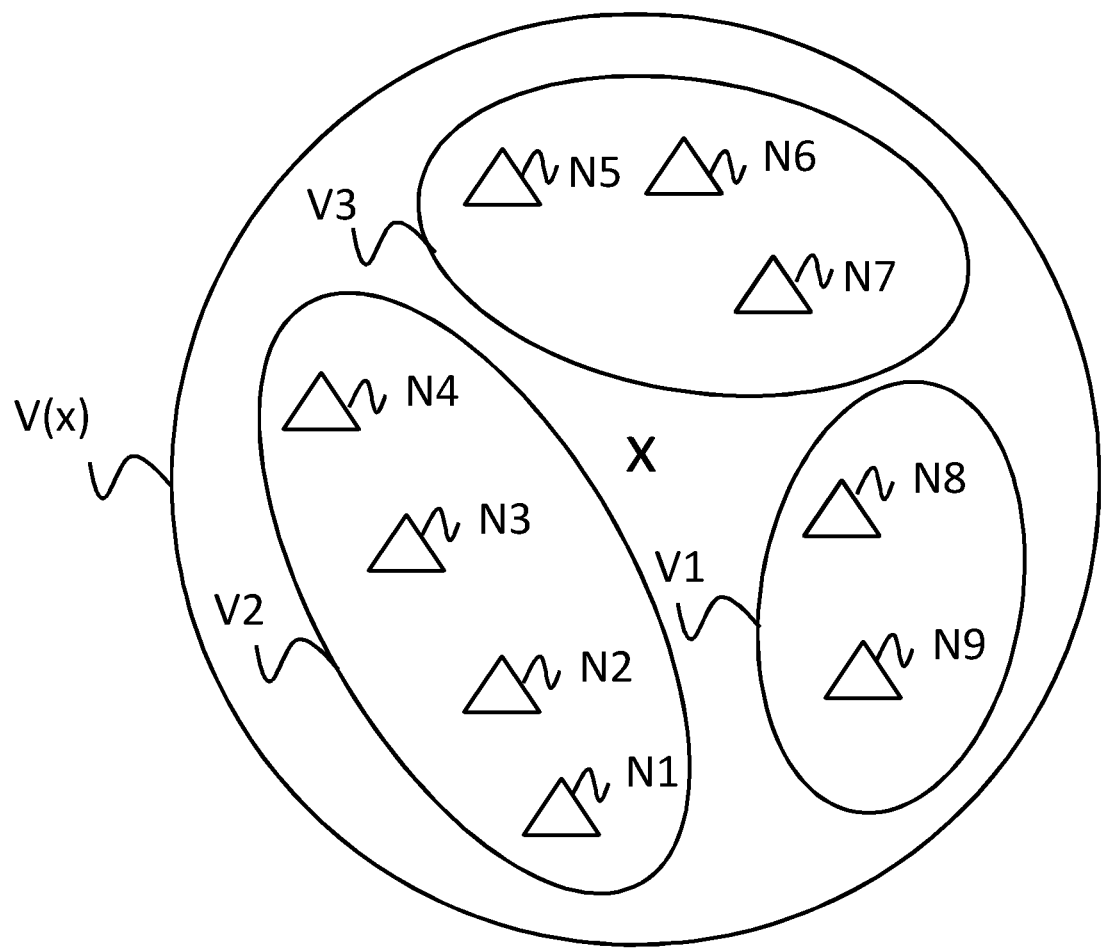
Figure 3:
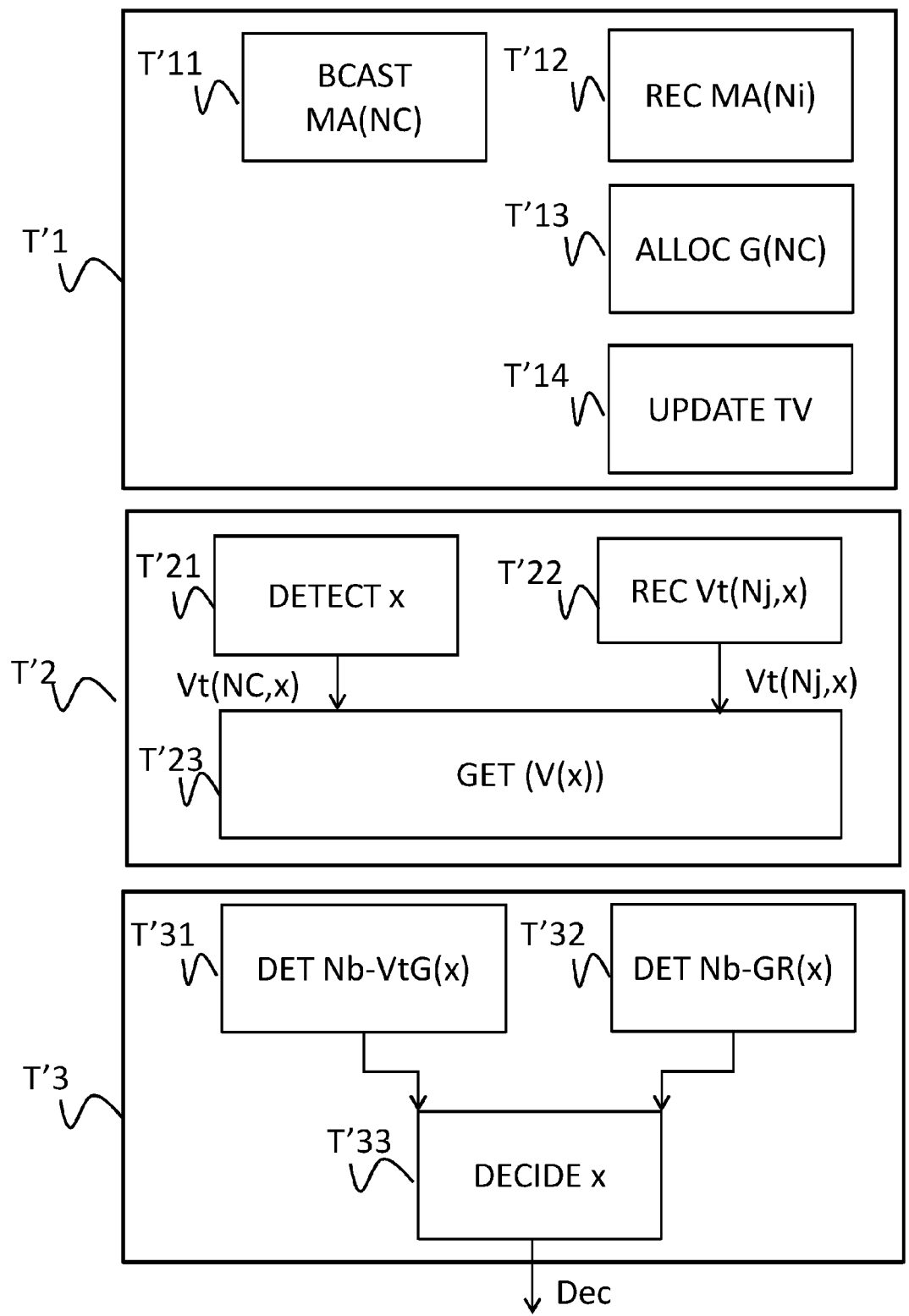
Figure 4:
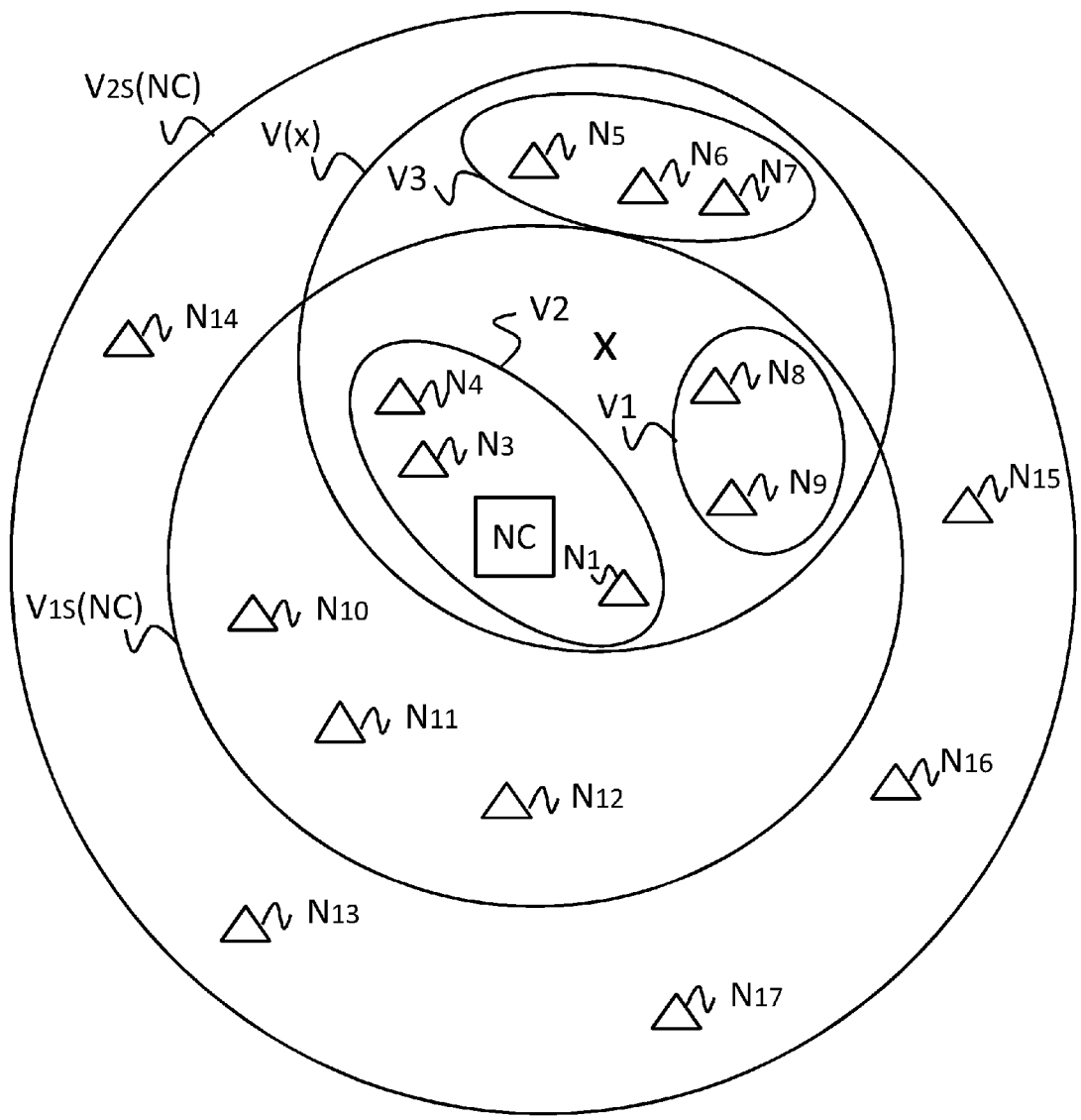
Figure 5:
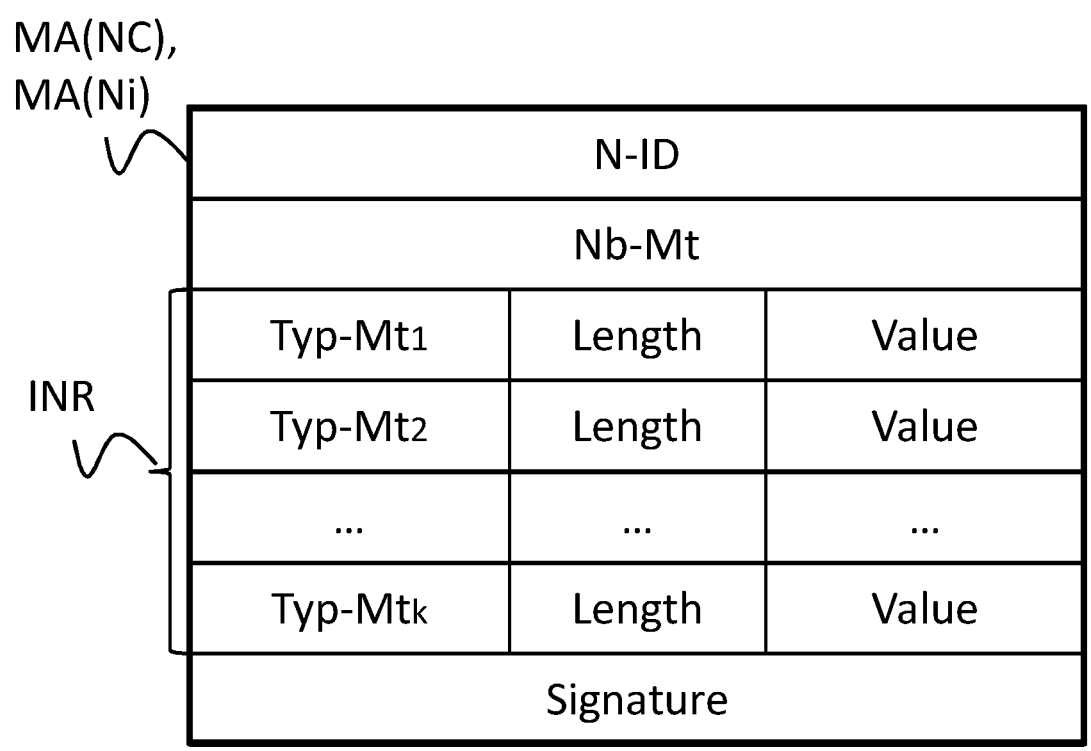
Figure 6:
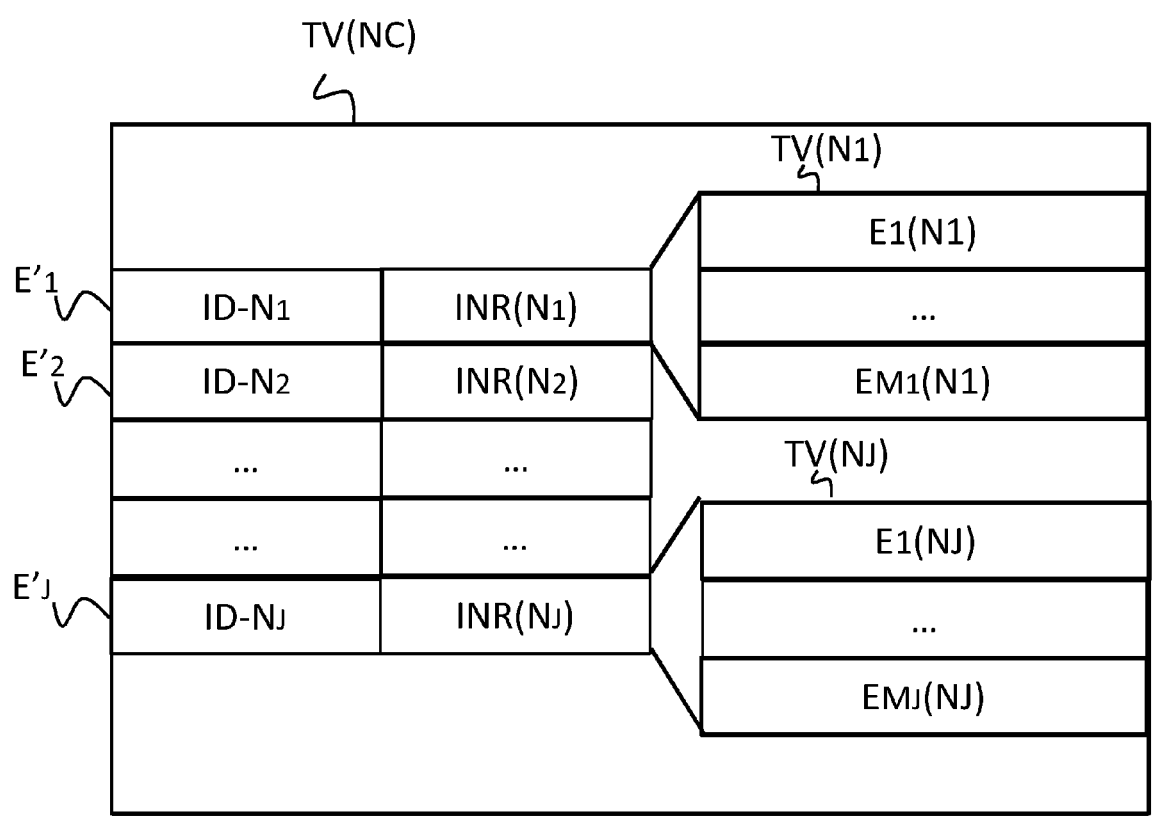
Figure 7:
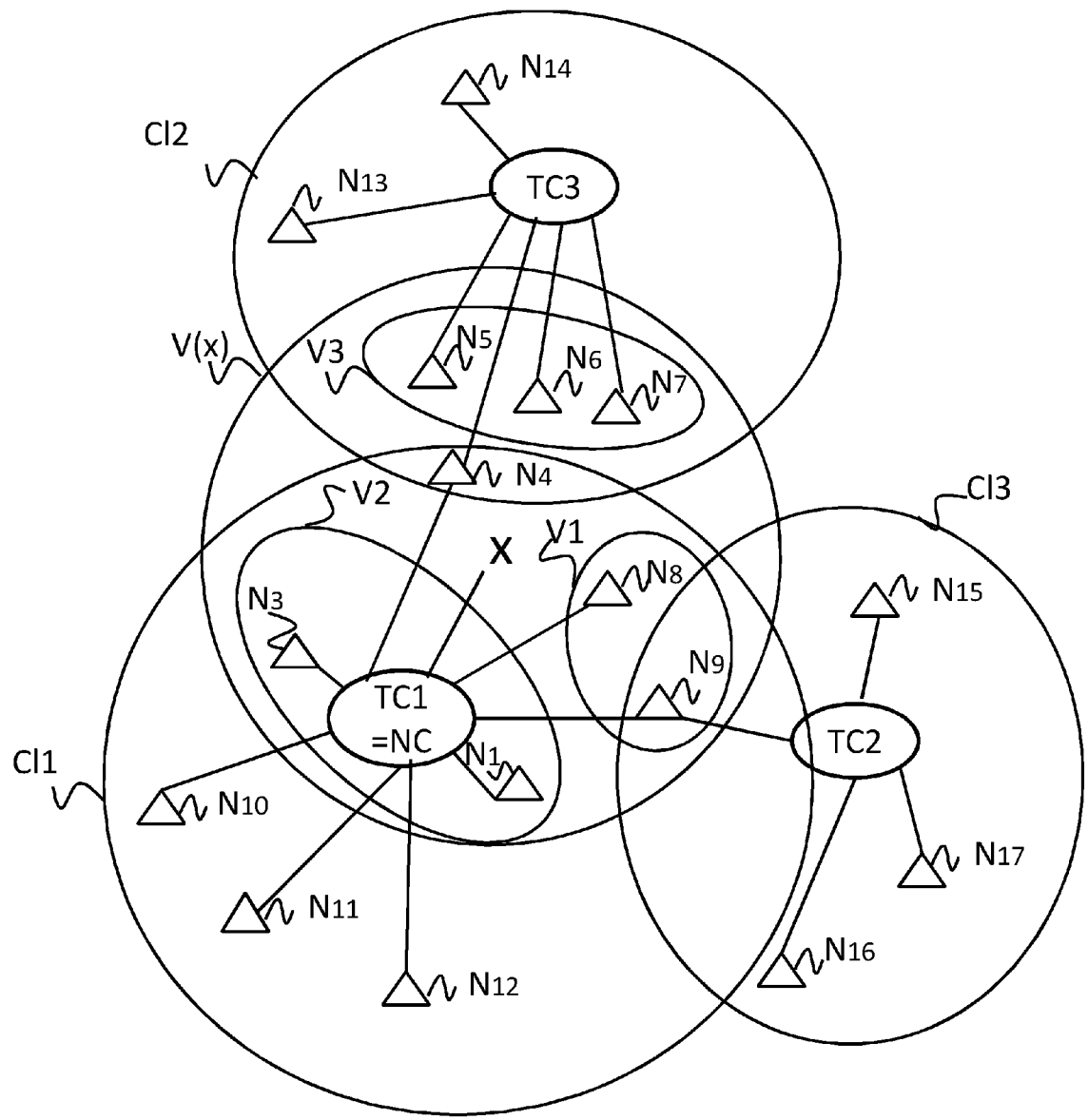
Figure 8:
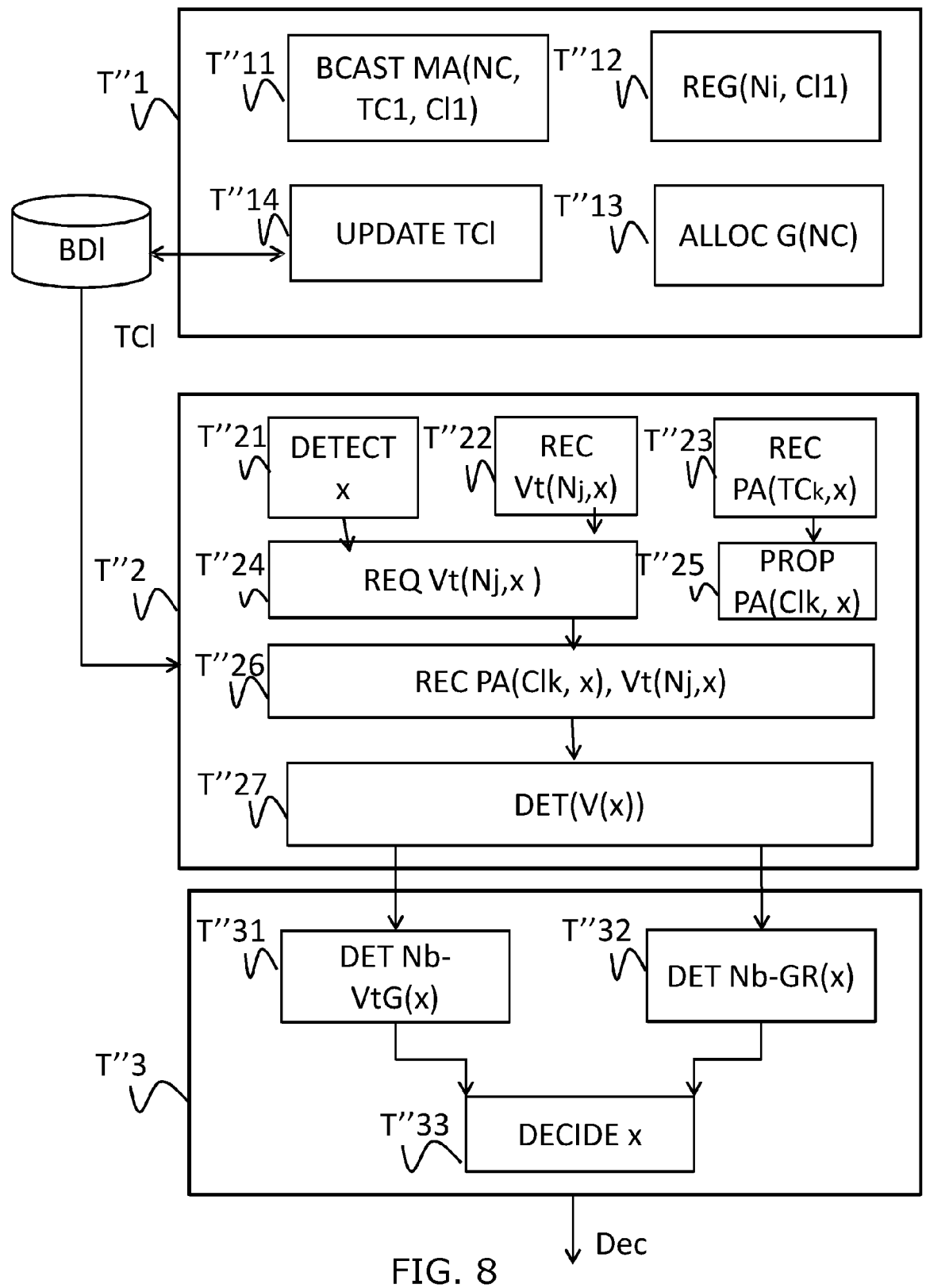
Figure 9:
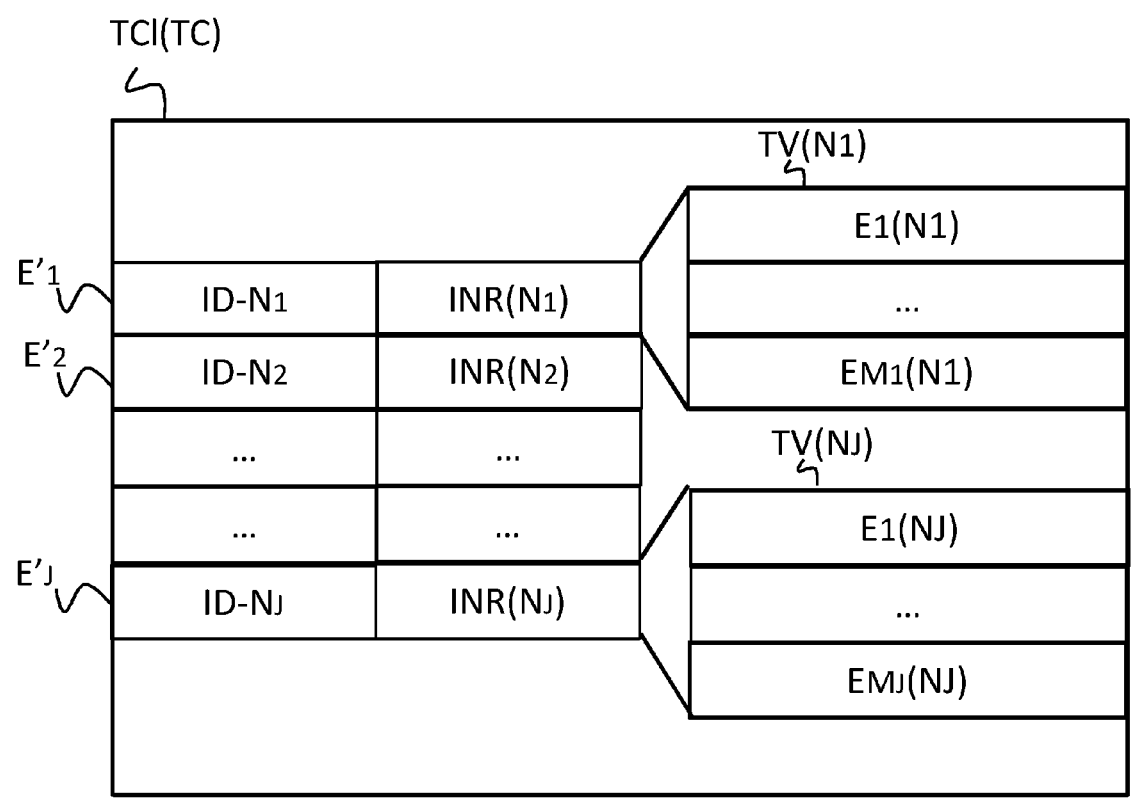
Figure 10:
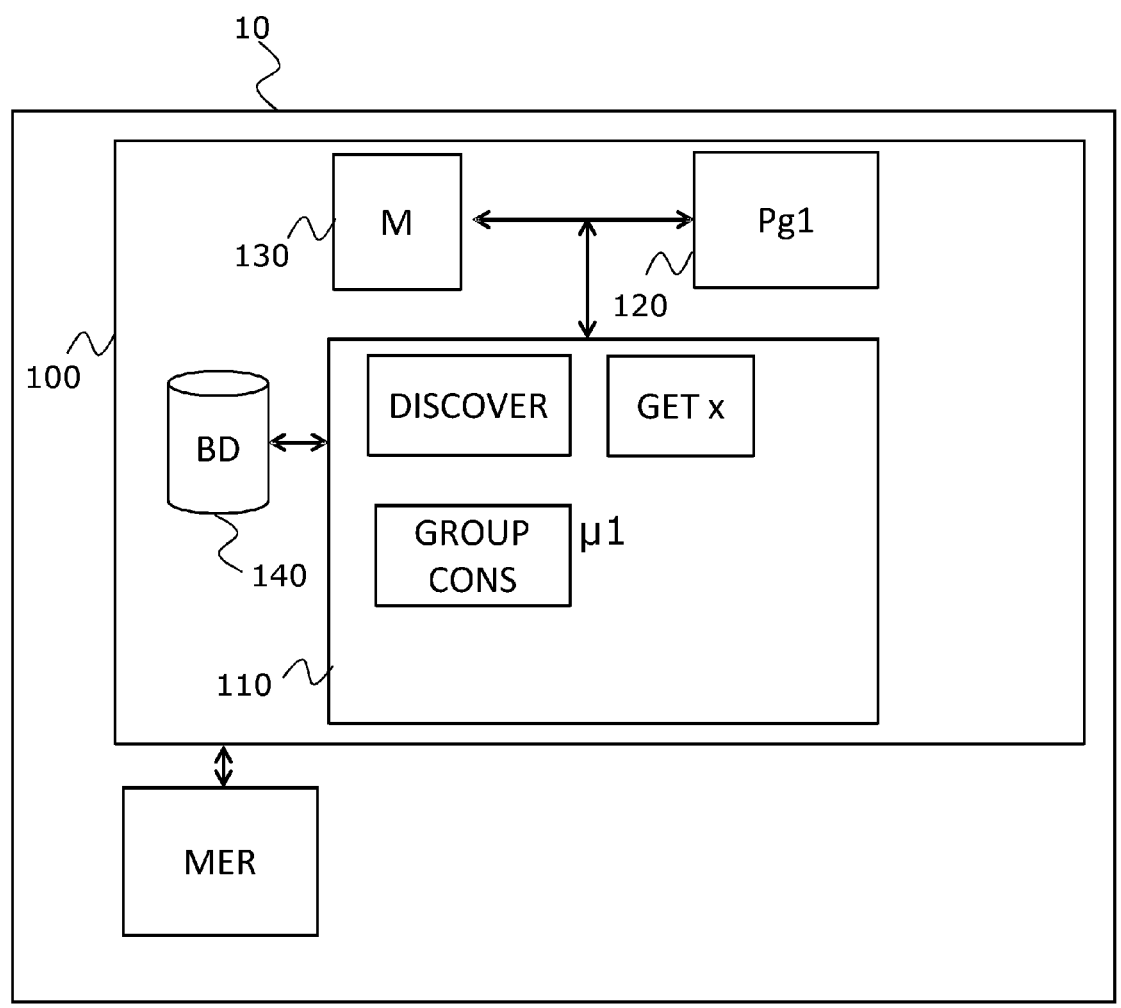

Other advantages and characteristics of the invention will appear more clearly on reading the following description of a particular embodiment of the invention, given by way of a simple illustrative and non-limiting example and of the appended drawings, among which:

FIG. 1, already described, shows schematically the steps of a method for processing an intrusion in a communication network according to the prior art;

FIG. 2 schematically illustrates an example of the neighbourhood of a suspect node of the invention;

FIG. 3 shows the steps of a method for processing an intrusion according to a first embodiment of the invention;

FIG. 4 schematically illustrates an exemplary neighbourhood of a current node implementing the method for processing an intrusion according to a first embodiment of the invention;

FIG. 5 illustrates schematically an example of a format of an announcement message broadcast by a node equipment in its neighbourhood according to one embodiment of the invention;

FIG. 6 schematically illustrates an exemplary neighbourhood of a current node implementing the method for processing an intrusion according to a first embodiment of the invention;

FIG. 7 schematically illustrates an exemplary neighbourhood of a current node implementing the method for processing an intrusion according to a second embodiment of the invention;

FIG. 8 schematically shows the steps of a method for processing an intrusion according to a second embodiment of the invention;

FIG. 9 schematically illustrates an exemplary structure of a cluster table implemented by the method for processing an intrusion according to a second embodiment of the invention; and FIG. 10 shows schematically an example of a simplified structure of a device for processing an intrusion according to the invention.

7. DESCRIPTION OF A PARTICULAR EMBODIMENT OF THE INVENTION

The general principle of the invention relies on the organisation of the neighbourhood of a suspect node in groups of nodes as a function of a resilience level common to intrusions and on the establishment of a consensus between the nodes of this neighbourhood, based on this grouping, the decision whether to treat a suspect node as a corrupt node taking into account one vote per group of nodes represented in the neighbourhood of this suspect node.

In the remainder of the description, consideration is given to a plurality of node equipment of a wireless communication network, implementing a radio communication technology, for example according to the IEEE 802.15.4 protocol.

In particular, a so-called "heterogeneous" network is considered, according to which the node equipment have different hardware and/or software configurations and, consequently, varying resilience levels for different types of intrusions or attacks.

In the examples which will be described in detail hereinafter, the node equipment are sensors of a sensor network, which are organised together in a distributed or hierarchical manner.

The sensors under consideration may be subjected to alternating awake and sleep periods, which is frequently the case in applications where they are subjected to high energy-saving constraints, but this is not mandatory. Indeed, the consensus mechanism of the invention can equally well apply to nodes which remain permanently awake.

Of course, the invention is not limited to these examples, the node equipment being equally well actuators, mobile phones, smart mobile terminals, portable computers, tablets or still any type of terminal able to be connected to a communication network. Such diversity is found for example in applications relating to the Internet of Things (IoT).

In addition, the invention applies to other types of networks, whether they are wired networks such as Ethernet-type broadcast networks, non-wired networks such as MANET mobile networks (for Mobile Area Networks) or mixing both communication technologies. For example, the SCADA-type industrial networks (for "Supervisory Control and Data Acquisition"), whose ISA 100.11A standard is based on a hierarchical architecture including subnets, according to which backbone routers node equipment communicate with each other by wire, while the "normal" nodes communicate by radio.

In connection with FIG. 2, we can see an exemplary neighbourhood V (x) of a suspect node x. The neighbourhood V(x) has 9 neighbouring nodes, NV1 to NV9.

The probability of corrupting the consensus lies in the probability of compromising a sufficient set of nodes corresponding to a threshold which may be represented by either the majority or by a constant c.

According to the invention, more generally, the nodes of the neighbourhood V of the suspect node x are grouped into subsets Vi, with i a non-zero integer, based on their belonging to a group of resilience according to the invention, defined from INR information received in the announcement messages of the nodes. Each of these subsets is disjoint with the others.

Therefore $V=\{V1, \ldots, Vn\} | \forall i,j \ Vi \cap Vj = \emptyset$.

We define two operators:
|X| is the cardinality of a set X i.e., the number of subset of X,
N(X) is the number of nodes of X i.e., the sum of the number of nodes of each subset.

It is assumed that the probability of an attacker to corrupt a node, such that finding a security vulnerability in its operating system or applications that make it up, is p.

An attacker which is able to access all the nodes belonging to the same resilience group, according to the invention can compromise all the nodes of the corresponding subset Vi using a single security flaw.

In fact, for all nodes belonging to the same neighbourhood subset, the probability of corrupting the set of nodes is the probability of corrupting one. The probability of corrupting a set is independent of corrupting the others.

Property 1: $\forall v \in V$, the probability of corrupting a subset $v$ is given by $P_c(v)=p$ An attacker can be classified according to these abilities. In the following, we consider a strong attacker who can therefore listen/communicate at a time t with all the network nodes. In fact, it can have high mobility of movement or advanced equipment such as high gain directional antennas to reach/listen to a larger number of nodes. Its object is to bias the consensus taking place and to make it possible to reverse the behaviour, malicious or not, of a node. We therefore define the possibilities of the attacker as follows:

Definition 1: an attacker can compromise a node with a probability p and can communicate or listen to all nodes of the network without any particular constraint.

To reverse a consensus, the attacker must corrupt a sufficiently large set of nodes and that exceeds a certain threshold. It is possible to define a set C which represents subsets of V whose node number exceeds this threshold. The property defining the set C is as follows:

Property 2: $C=\{C_1, \ldots, C_m\} | \forall i \ C_i \subset V \wedge N(Ci) \geq threshold \wedge \forall j \neq i \ Ci \neq Cj$ Depending on properties 1 and 2, one can deduce the probability of corrupting the consensus that is given by the following property:

Property 3: Let there be $C=\{C_1, \ldots, C_m\}$, the probability of corrupting the consensus is likely to corrupt at least one element of C, thus:

$$P_{cc}(C) = \sum_{i=1}^{m} p^{|C_i|}(1-p)^{|V|-|C_i|}$$

Depending on the property 3, we can determine the probability $P_c(C_i)$ to corrupt a set $C_i$ of nodes. This probability is stated by property 4:

Property 4:
$\forall C_i \in C, \exists C'=\{C'_1, \ldots, C'_o\} \subset C | \forall j \in \{1 \ldots o\} C_i \subset C'_j \Rightarrow P_c(C_i) = \sum_{i=1}^{o} p^{|C'_j|}(1-p)^{|V|-|C'_j|}$ The object of the attacker will be to find the smallest subset Cj of nodes that satisfies the consensus threshold. In fact, the attacker will have to compromise the subset of nodes with the greatest probability. Depending on property 4, the following property can be deduced:

Property 5: Let there be $C=\{C_1, \ldots, C_m\}$, the attacker must corrupt $C_i | P_c(C_i) = \max_{j=1, \ldots, m} P_c(C_j)$ In the example of FIG. 2, the nodes of this neighbourhood are grouped into three subsets depending on their operating system:
  A first subset V1 corresponding to the resilience group G1, which has two nodes NVx2, NVx3;
  A second subset V2 corresponding to the resilience group G2, which has four nodes NVx1, NVx7, NVx8, NVx9;
  A third subset V3 corresponding to the resilience group G3, which has three nodes NVx4, NVx5, NVx6.

The total number of nodes in the neighbourhood V(x) of the suspect node x being 9, and it is assumed that the consensus threshold is a constant c with a value equal to 4. In fact, at least 4 nodes must have detected an attack and announced that x is corrupt for the consensus to decide that the node x is indeed corrupt.

It is assumed that the probability of corrupting V1, V2 or V3 is the same and therefore $\forall i \in \{1, \ldots, 3\} Pc(Vi)=0.2$.

The attacker must therefore corrupt a subset of V whose number of nodes is greater than or equal to 4 in order to corrupt the consensus.

The set of elements that can be corrupted in this case is $C=\{V2, \{V1, V2\}, \{V1, V3\}, \{V2, V3\}, \{V1, V2, V3\}\}$.

Depending on property 3, the probability of corrupting the consensus is: $P_{cc}(C)=0.2\times(0.8)^2+3\times0.2^2\times0.8+0.2^3=0.232$ Depending on property 4, we can deduce the probability of corrupting each subset:

$P_c(\{V1, V2, V3\})=0.2^3=0.008$
$P_c(\{V1, V2\})=P_c(\{V1, V3\})=P_c(\{V2, V3\})=0.2^2 \times 0.8+0.2^3=0.04$
$P_c(V2)=0.2 \times 0.8^2+2 \times 0.2^2 \times 0.8+0.2^3=0.2$ Indeed, the example emphasises that the attacker has every interest in corrupting the smallest subset of nodes in order to modify the consensus. In this example, the probability of corrupting V2 is much greater than the probability of corrupting sets of larger size, that is, composed of several subsets.

FIG. 3 shows the steps of a method for processing an intrusion according to a first embodiment of the invention.

According to this first embodiment of the invention, it is considered that the nodes of the network RC are organised according to a distributed architecture.

Such a method is advantageously implemented by a current node NC of the communication network RC. An exemplary neighbourhood of the current node NC is illustrated in connection with FIG. 4.

During a step T1, the current node NC discovers its one-hop neighbourhood V1S(NC) and its two-hop neighbourhood V2S(NS). To this end, in a known manner, each node device, in particular the current node NC, periodically sends a neighbourhood message which contains at least one identifier (NC) of the current node and at least one list of its one-hop neighbouring nodes.

At initialization, it is assumed that the current node NC has assigned to each of its neighbours a "normal" or "reliable" status.

As shown in FIG. 4, a one-hop neighbouring node of the current node NC belongs to V1S(NC) and a two-hop neighbouring node of the current node NC belongs to V2S(NS) \V1S(NC), the operator\representing exclusion from a combinatorial point of view.

According to the invention, it broadcasts in T' 11 an announcement message MA (NC) to its one-hop and two-hop neighbours and in T'12 it receives announcement messages MA(Ni) from its one-hop and two-hop neighbours.

According to the invention, the announcement message MA broadcast by a node equipment, for example the current node NC, comprises at least one identifier ID(NC) and at least one piece of information INR representative of a resilience level of the current node to at least one type of intrusion, in other words a sensitivity to at least one type of security flaw.

According to a first aspect of the invention, this piece of information INR includes a resilience group identifier ID-G to which the neighbouring node belongs. This identifier has been previously assigned to it by an administrator equipment or a trusted authority.

According to a second aspect of the invention, said piece of information INR representative of a resilience level of the node comprises at least one element of metrics, whose characteristic is representative of a hardware and/or software configuration of such equipment node considered.

In connection with FIG. 5, we present an example of a structure of an announcement message MA according to this second aspect of the invention. The information INR includes K metrics m1 to mK, with K a non-zero integer, with characteristics representative of a hardware and/or software configuration of the node equipment. Advantageously, it also comprises a field Nb-M representative of a total number of relevant metrics and used for the particular node.

All announced metrics can identify a node quite finely. Metrics allow for a more or less fine granularity to segment the network nodes and to decide which sets will participate in the consensus. Of course, these metrics are selected based on an incidence with respect to the level of resilience of the particular node equipment.

By way of example, the element of metrics m1 identifies the operating system implemented by the node equipment and takes different values to designate an operating system, Android, IOS, WindowsPhone, etc.

In connection with FIG. 2, for example it is considered that the neighbourhood of the suspect node can be segmented into three subsets based on the element of metrics m1: the nodes of the subset V1 use a first operating system, for example WindowsPhone the nodes of the subset V2 use a second operating system, eg Android and the nodes of subset V3 use a third operating system, for example iOS. This type of metrics is simple, but offers a fairly coarse-granularity size but still allows for quite a sizeable breakdown of the nodes. It has the advantage of limiting the information disclosed on the nodes that could be used by the attacker. Indeed, knowing the operating system is a good way for the attacker to focus on security flaws already known.

The administrator of the network RC must find a balance between disclosing any information characterising the nodes and securing the consensus mechanism. Indeed, a large number of metrics will greatly increase the resilience of the consensus mechanism but in return it will allow the attacker to better identify the nodes surrounding it.

The element of metrics m2 is for example representative of a version of the operating system identified, eg Android 4.4, IOS 8, WindowsPhone 8.1.

The version of the operating system consists in metrics providing a much finer granularity than the operating system. Indeed, it will allow much more significant segmentation of the network nodes. Similarly, some versions of an operating system can be placed in blacklists if security flaws are known and uncorrected. It can greatly increase the resilience of the consensus mechanism.

The element of metrics m3 is for example representative of a material or a device installed on the node equipment.

The material can also be a factor in the corruption of a piece of equipment. For example, the presence of USB ports on a device allows a user to connect USB keys whose content is not safe and might compromise the functioning of the latter. It may be interesting to quantify the devices based on their physical ability. Indeed, equipment having no USB ports will be segmented from the rest of the network.

The combination of the three previous metrics enables to achieve the greatest level of granularity. It provides very good segmentation of the equipment. In return, it highlights a large number of pieces of information regarding the network equipment.

Advantageously, the metrics contained in the announcement message of a node have been certified by a trusted authority, such as an administrator unit or a collector unit of the communication network.

The metrics pertaining thereto for example have been received from the current node in a preliminary phase before the deployment of the network. For example, they were signed by the certificate of the trusted authority.

We understand that such a signature is required so that a compromised node cannot change its metrics at will.

Each node knows the public key of the trusted authority enabling it to verify the signature of the metrics transmitted by a node participating in the consensus.

According to this second aspect of the invention, the current node should define itself the resilience groups to which its neighbours belong, from the values of metrics of characteristics received.

At least three cases are possible:

The current node has obtained, prior to the discovery of its neighbourhood, information on the total number of metrics to take into account and the total number of possible values per each element of metrics Nb-Val (mk). In this way, the current node was able, during a preliminary step, to define resilience group from the different possible combinations of metrics and to assign them a group identifier.—Advantageously, it is assumed that all the nodes have received the same information, that they define the groups and assign the group identifiers in a similar way. In this way, the group identifier information can then be shared between the nodes;

The current node NC defines the resilience groups represented in its neighbourhood during the discovery of this neighbourhood, on the fly, as it receives the announcement messages from its neighbours, as a function of the different metrics received and of the values received for these metrics. Advantageously, it assigns a group identifier to each new identified resilience group in accordance with an order for receiving the announcement messages originating from its neighbourhood. In this case, the group identifiers thus defined can only be used locally, as there is no guarantee that they have been assigned in the same way by a neighbouring node.

Let us assume for example that it first receives a first announcement message indicating a metric value m1 corresponding to the Android operating system and a value metric m2 for the Android version 4.4, it assigns to it a group identifier ID-G, for example equal to 1. On receiving a second message announcement indicating a metric value m1 corresponding to the Windowsphone operating system and a value metric m2 for the version 8.1, it defines a second group identifier, for example equal to 2.

The current node NC stores the metric values of characteristics received for each neighbour in a neighbour table and reports the definition of the resilience groups to the establishment of a group consensus from the values of metrics stored.

In connection with the example of FIG. 3, the second case is considered. Upon receiving an announcement message MA from a neighbouring node, the current node NC therefore extracts the values of metrics and, during a step T'13, affects the neighbouring node considered, a group identifier ID-G that defines based on values of metrics extracted from those previously received from other neighbours and identifiers of previously defined groups.

During a step T'1,4, the current node NC updates a neighbouring table TV, by adding an entry for the neighbouring node NV he has just discovered. An example of such neighbour table is presented in connection with FIG. 5.

According to the invention, this entry E(NV) comprises at least:

The identifier ID(NV) of the neighbouring node discovered,

The information INR representative of a resilience level of the neighbouring node.

Optionally, the identifier of the group ID-G (not shown) that has been assigned to it;

Entries of the neighbourhood tables of its neighbours, especially those of their one-hop neighbours.

At the end of step T1 of discovery, the current node NC knows its 1-hop neighbours, its 2-hop neighbourhood, and for each of its neighbours, the identifier ID-G of the resilience group that it affected thereto.

Let us assume now that an intrusion in the communication network RC has been detected in the neighbourhood of the current node NC. The current node NC then implements a T'2 step of detecting an intrusion.

Two cases are possible:

during a T'21 step, the current node NC has itself detected, using its local detection module, a node x with a suspicious behaviour in its immediate neighbourhood, that is to say, within one hop V1S(NC). In this case, it alerts its two-hop neighbours by broadcasting during a step T'22, an alert message identifying the suspect node x;

in T'22, the current node receives one or more alert messages from its neighbours, pertaining to the node x.

It is also possible that both cases occur simultaneously or sequentially, that is to say that the current node detects a suspect node in its neighbourhood and receives one or more alert messages from some of his neighbours. This situation is all the more likely with neighbouring nodes with a hardware or software configuration similar to that of the node and a similar intrusion detection module.

In a sub-step T'23, the current node NC determines the 1-hop neighbourhood V1S (x) of the suspect node x, referred to below by V(x). Following the discovery stage T1, it has indeed all the necessary information in its two-hop table of neighbours TV.

When determining neighbourhood, the current node NC lists the one-hop neighbours of the suspect node x and advantageously for each of them, the resilience group to which it belongs.

During a T'3 step, the current node evaluates whether there is a group consensus in the neighbourhood of the suspect node x on the fact that an attack has occurred and that that suspect node has been corrupted.

During a T'31 step, the current node NC counts the number of groups represented in V(x) that detected the intrusion at the node x, from the alert messages received from the nodes in the neighbourhood V(x).

With the invention it may be tolerated only when a neighbouring node x does not detect any intrusion, it does not need to transmit a voting message. If the current node does not receive a voting message from a neighbouring node belonging to the one-hop neighbourhood of x, the vote for this node is counted as negative. This is not necessarily the case of the resilience group to which he belongs, provided that at least one node of V(x) belonging to this resilience group has detected the intrusion and transmitted its alert. It is an advantage of the invention, which reduces the amount of information exchanged over the network.

Note that in the case of a "wormhole" type of attack, the location of a node affects its ability to detect the intrusion. The result is that both nodes in the neighbourhood of a suspect node equipped with the same intrusion detection module, belonging to the same resilience group, but localised differently in relation to the suspect node, does not necessarily react similarly, whereas one can detect the intrusion and the other cannot.

With the invention, the important thing is that one of them detects the intrusion and feeds the vote of the group. The invention thus increases the network resilience to attacks of this type.

Upon completion of this step T'31, the current node NC obtains a number of group votes nb-VTG.

During a step T'32, the current node NC determines the total number of resilience groups represented Nb-GR(x) in the neighbourhood V(x) of the suspect node x.

During a step T'33, the current node NC makes a decision based on the consensus established. Advantageously, it decides to isolate or not the suspect node x from the number of group votes nb-VG obtained and the total number of groups represented in the neighbourhood V(x) of the suspect node x.

Advantageously, it compares the number of group votes to the total number of groups represented Nb-GR(x) and if it is greater than half the number Nb-GR(x), it decides that the suspect node x must be considered as corrupt and isolated.

Let us now consider, in connection with FIG. 6 a second embodiment of the invention in which the communication network RC is organised hierarchically.

According to this architecture, the nodes are grouped into clusters, each cluster being supervised by a so-called "cluster head" node TC and enjoying particular prerogatives. In particular, the cluster head node determines the behaviour of the nodes in its cluster.

FIG. 6 illustrates three clusters C11, C12, C13 for example. We consider the current node NC that belongs to the cluster C11 and acts as a cluster head.

It will become apparent note that a node can belong to one or more clusters. This is particularly the case of the node N9 that belongs to both clusters C11 and C13 and of the node N4 which belongs to both clusters C11 and C12.

In connection with FIG. 7, we shall describe the steps of the method for processing an intrusion implemented by the current node NC according to the second embodiment of the invention.

In this embodiment of the invention, it is assumed that the nodes are arranged to operate in a self-organised manner without restriction. In a known manner, when initializing the network, the current node NC discovers its one-hop neighbourhood during a step T1". It starts by monitoring the network for a predetermined period of time. If no node comes across as playing the part of a head cluster, then the current node asserts itself as the cluster head of a cluster C11.

Alternatively, the topology of nodes may form in a self-organised manner with restriction. In this case, a network administrator or a certification authority declares in a prior step, nodes which are qualified to become cluster heads. These nodes can be distinguished, for example, by a resilience to attacks which is far more important than others. One advantage is to limit the risk of appointing a corrupt node as cluster head.

Once the topology of the network has been organised, the current node announces in T"11 to its one-hop neighbours it that it acts as a cluster head. Advantageously, it periodically renews its announcement to inform about potential nodes arriving in this cluster.

Upon receipt of this announcement, the neighbouring nodes, one hop away from the current node NC cluster head register at cluster C11 with NC with an announcement message, also called registration message at the cluster, with a structure similar to that of the announcement message previously described for the first embodiment of the invention. Such a registration message at the cluster includes at least one identifier N-ID of the neighbouring node, said at least one representative INR information of a resilience level of the node to one or more types of attacks and the entries E1 to EJ, with J a non-zero integer, from its table of one-hop neighbours TV. We shall note that these entries include, for each neighbour of the neighbouring node that registers at the cluster, or said at least one piece of information INR representative of a resilience level of the node, an identifier G-ID of the resilience group to which it belongs so that the current node TC1 can obtain directly or indirectly the group resilience to which this node belongs from that information.

In the following description of this example, let us assume that the messages MA include the information INR.

We shall note that the neighbours of the current node, members of the cluster, can advantageously and periodically send their neighbours's table, for example following the addition or deletion of an entry.

Advantageously, the cluster head current node attributes, during a stage T"13, to each member registered in its cluster an identifier of the resilience of the group to which it belongs, from a plurality of groups that it has previously defined during a preliminary step or that it he has made on the fly, as previously described in the framework of the first embodiment of the invention. In the following description, we consider that these identifiers of resilience groups are local in the cluster head node TC1.

Alternatively, they may be propagated to other cluster head nodes. However, a list of group IDs should have been transmitted previously to all nodes in the network by an administrator equipment or a trusted authority to ensure that each node uses the same identifiers to designate the same groups.

Finally, during a step T"14, the current node TC1 updates a cluster table TC1, comprising for each neighbouring node which is a neighbour member of the cluster, an entry E'j associating to an identifier of the node ID-N(nj), its information INR, for example the values of metrics of configuration of characteristics and the entries of its neighbours table. An example of such cluster table TC1 is presented in connection with FIG. 9.

Upon the completion of this discovery stage T"1, the current node TC1 so knows the members of its cluster C11, their resilience group, their one-hop neighbours the resilient group of their neighbours.

We shall now consider a step T"2 of detecting an intrusion in a communication network clustered according to the second embodiment of the invention. Three cases are possible:
  The current node TC1 itself detects a suspect node x in its cluster c11 during a sub-step T"21;
  The current node TC1 receives an alert message Vt (Nj,x) from a member node Nj of its cluster C11 about a suspect node x, during a sub-step T"22;
  The current node TC1 receives an alert message PA (TCk, x) from a neighbouring cluster head TC2, TC3.

We shall note that it is also possible that the three cases occur simultaneously or sequentially.

In response to an internal alert to the cluster TCL1, the node TC1 questions in T"24 the members of its cluster C11 with a request message REQ (Nj, x) to know for their vote about the suspect node x. In return, it receives in T"26 responses from members of its cluster that have detected the suspect node x. Then, for example upon expiry of a predetermined time, the cluster head node TC1 propagates in T"25 an alert message PA (C11, x) to the neighbouring cluster heads, TC2, TC3 including at least one identifier of the suspect node x, the information INR of the member nodes of C11 having identified the node x as suspect and the information INR of the member nodes of C11 which have not identified the node x as suspect.

We understand that at this stage the node TC1 has only partial knowledge of the neighbourhood of the suspect node x and it spreads this alert to neighbouring clusters in order to complete it.

In return, it receives in T"26 responses from the neighbouring cluster heads, a response message from a neighbouring cluster head comprising, similar to the alert message spread, at least one identifier of the suspect node x, the information INR of the members of the neighbouring cluster which have detected the suspect node x and the information INR of the members of the neighbouring cluster that have not detected the suspect node x.

Upon completion of this step, the node TC1 has the necessary information to update in T"27 its knowledge in the neighbourhood V(x) of the suspect node x, i.e. to determine the identifiers of the groups represented in this neighbourhood and the group identifiers which have detected x as a suspect node.

In response to an external alert to its cluster, received in T"23 as an alert message PA spread by a neighbouring cluster head, for example TC2 and TC3, the node TC1 triggers several actions:

It diffuses in its cluster in T"24 a request relative to the node x to know the members of its cluster which have detected it as suspect;

It propagates directly in T"25 the alert message PA received from the neighbouring cluster head to other neighbouring cluster heads;

Further to the reception of responses from members of its cluster in T"26, it propagates in turn an alert message PA' to the neighbouring cluster heads. This message PA' includes at least one identifier of the suspect node x, the information INR of the member nodes of its cluster that have detected x as suspect and the information INR of the member nodes of its cluster which have not detected it as suspect;

Optionally, it receives other alert messages propagated by other cluster heads and relative to the node x.

Upon expiry of a predetermined period, the node TC1 operates in T"27 the information received to complete its knowledge of the neighbourhood V(x) of the suspect node x and in particular, determine the identifiers of the groups represented in the neighbourhood x which suspect the node x and those of the groups represented in the neighbourhood of x which do not suspect it.

During a step T"3, the current node TC1 establishes a group consensus about the suspect node x. It starts by determining the total number in T"31, the total number Nb-GR of resilience groups represented in this neighbourhood from the information obtained in T"2.

In T"32, it determines the number of votes Nb-VG for a corruption of the node x in the neighbourhood V(x).

From this information, it decided in T"33 the result of consensus.

If the decision of the consensus is that the node x is corrupted, the cluster head node will trigger different actions to protect the communication network.

Advantageously, the cluster head node isolates the network node, making it necessary for the node x is no longer involved in the network operation: the messages sent by the node x will no longer be treated with its neighbouring nodes, the routing protocols will no longer consider that node in the creation of routes and it will be excluded from future group consensus.

Alternatively, it damages the reputation of the node x within the communication network, which will effectively contribute to its isolation.

It is understood that actions similar to those triggered by the node TC1 following the decision of the group consensus can be triggered in parallel by other cluster heads which established the group consensus at their level and decided similarly that the node x was corrupt.

It is understood that these actions must be triggered in a coordinated manner between the network nodes. For example, the cluster head nodes determine the actions to be triggered from predetermined rules, shared by them.

In addition, the cluster head node notifies the other cluster head node of the status change of the node x. In this way, the other cluster heads that have not detected the intrusion nor implemented the consensus, may trigger the necessary actions to protect the network from future attacks of the node x, especially if it moves closer to these other nodes.

Alternatively, it informs the trusted authority such as the network administrator or the collector, that the node has been involved. The trusted authority is then responsible for notifying the nodes of the network. Knowing the group of resilience that owns the compromised node, the trusted authority can trigger preventive actions in the network for this group.

Advantageously, the nodes of the network and/or the trusted authority maintain a "blacklist" of metrics in terms of hardware and/or software configuration, corresponding to those of recently corrupted nodes. From this information, the trusted authority can inform the network nodes of the sensitivity of certain resilience groups to security flaws or equivalently that nodes with certain metric values of characteristics, such as a some version of an operating system, should not participate in the consensus because of their vulnerability to one or more types of attacks. Advantageously, a message of this type is signed by the trusted authority to ensure integrity.

Note that the invention which has just been described, can be implemented using software and/or hardware components. In this context, the terms "module" and "entity" used in this document, can correspond either to a software component or a hardware component or even a set of hardware and/or software components, capable to implement the function(s) outlined for the module or entity concerned.

FIG. 10 now shows schematically an example of a simplified structure of a device 100 for processing an intrusion according to the invention. The device 100 implements the method for processing an intrusion according to the invention which has just been described in its different embodiments in connection with FIGS. 3 and 8.

For example, the device 100 includes a processing unit 110, equipped with a processor μl and driven by a computer program $Pg_1$ 120, stored in a memory 130 and implementing the method according to the invention.

At initialization, the code instructions of the computer program $Pg_1$ 120 are for example loaded into a RAM before being executed by the processor of the processing unit 110. The processor of the processing unit 110 implements the steps of the method described above, according to the instructions of the computer program 120.

In this embodiment of the invention, the device 100 includes at least one unit DISCOVER for the discovery of a neighbourhood of the current node and of the groups represented in this neighbourhood, a unit GET X for detecting a suspicious node in its neighbourhood, a unit GROUP CONS for determining a group consensus able to decide a change in status of a suspect node following the result of the consensus.

The device 100 further includes a unit BD 140 capable of storing a table of neighbours TV of the current node.

According to one aspect of the invention, such a unit BD can also store the cluster table TC1 of the cluster for which the current node acts as a cluster head.

These units are driven by the processor µl of the processing unit 110.

Advantageously, such a device 100 can be integrated with a node equipment NC. The device 100 is then configured to work at least with the next module of this node equipment:
a data transmitting/receiving module E/R, through which the node transmits messages to its neighbours so as to implement the invention.

An exemplary embodiment of the present disclosure overcomes the shortcomings of the prior art.

An exemplary embodiment proposes a solution that is more adapted to heterogeneous networks, in which coexist populations of node equipment with different hardware and/or software configurations.

It goes without saying that the embodiments which have been described above have been given purely by an indicative and non-limiting way, and that many modifications can be easily made by those skilled in the art without departing from the scope of the invention.

The invention claimed is:

1. A method for processing in a communication network comprising a plurality of node equipment, said method comprising acts implemented by one of said node equipment, called a current node, the acts comprising:
discovering a neighborhood of the current node;
detecting an intrusion affecting at least one suspect node of the neighborhood of the current node;
establishing a group consensus affecting said at least one suspect node in a neighborhood of the at least one suspect node; and
deciding to change a status of the at least one suspect node based on a result of the group consensus;
wherein:
the act of discovering comprises receiving announcement messages coming from neighboring nodes of the current node, the announcement messages comprising at least one identifier of the neighboring node and at least one piece of information representative of a resilience level of the neighboring node to at least one type of intrusion, and assigning a group of resilience to the neighboring node, based on the at least one piece of information;
the act of establishing a group consensus counts a number of resilience groups having detected the intrusion and a total number of resilience groups represented in the neighborhood of the at least one suspect node;
the act of deciding to change the status of the at least one suspect node takes into account a comparison of the number of resilience groups having detected the intrusion with respect to the total number of resiliency groups represented in the neighborhood of the at least one suspect node.

2. The method for processing according to claim 1, wherein said at least one piece of information representative of a resilience level of the node adjacent to at least one type of intrusion, comprises a resilience group identifier.

3. The method for processing according to claim 1, wherein said at least one piece of information representative of a resilience level of the neighboring node comprises at least one characteristic representative of a hardware or software configuration of this node and the act of discovering comprises, following the reception of announcement messages from neighboring nodes, an act of defining resilience groups from the characteristics received.

4. The method for processing according to claim 1, further comprising a prior act of obtaining said at least one piece of information representative of a resilience level of the current node originating from a trusted authority.

5. The method for processing according to claim 4, wherein the act of obtaining comprises receiving a message comprising said at least one piece of information, said message comprising a digital signature of the trusted authority, and verifying the digital signature from a public key of the trusted authority.

6. The method for processing according to claim 1, wherein the act of discovering a neighborhood of the current node comprises updating a neighboring table comprising one entry per neighboring node, said entry comprising at least one identifier of the neighboring node, said at least one piece of information representative of a resilience level of the neighboring node and of the entries of the neighboring table of the neighbour node.

7. The method for processing according to claim 6, characterised wherein said entry further comprises an identifier of the group assigned to the neighboring node by the current node.

8. The method for processing according to claim 1, wherein the nodes are organised into a plurality of clusters comprising member nodes, the current node acts as a cluster head, and the method comprises:
upon reception of an announcement message from a neighboring node, recording as a member node the cluster of the current node;
upon detection of an intrusion by a member node of the cluster or by a neighboring cluster head node, spreading an alert message to the head nodes of neighboring clusters and reception of alert message from the head nodes of neighboring clusters, one said alert message comprising at least one identifier of the suspect node, information representative of a resilience level of the member nodes of the cluster having detected the intrusion and information representative of a resilience level of the member nodes of the cluster which have not detected the intrusion;
once the decision has been made, transmission of a message spreading the decision at least to the member nodes of the cluster and of the head nodes of neighboring clusters.

9. A device for processing in a wireless communication network comprising a plurality of node equipment, including a current node, said device comprising:
a non-transitory computer-readable medium comprising instructions stored thereon; and
a processor configured by the instructions to perform acts comprising:
discovering a neighborhood of the current node;
detecting an intrusion affecting at least one suspect node of the neighborhood of the current node; and
establishing a group consensus affecting said at least one suspect node in a neighborhood of the at least one suspect node capable of making a decision relative to a change in status of the at least one suspect node according to a result of the group consensus;
wherein:
the act of discovering a neighborhood comprises receiving announcement messages coming from neighboring nodes of the current node, the announcement messages comprising at least one identifier of the neighboring node and at least one piece of information representative of a resilience level of the neighboring node to at least one type of intrusion, and assigning a group of resilience to the neighboring node, based on said at least one piece of information;

the act of establishing a group consensus counts a number of resilience groups having detected the intrusion and a total number of resilience groups represented in the neighborhood of the at least one suspect node;

the act of deciding to change the status of the at least one suspect node takes into account a comparison of the number of resilience groups having detected the intrusion with respect to the total number of resiliency groups represented in the neighborhood of the at least one suspect node.

10. The device according to claim 9, wherein the device is comprises in one of the plurality of node equipment of the communication network.

11. A wireless communication network, which comprises:
a plurality of node equipment, at least one of the plurality of node equipment, called a current node, comprising a device for processing;
the device for processing comprising:
a non-transitory computer-readable medium comprising instructions stored thereon; and
a processor configured by the instructions to perform acts comprising:
discovering a neighborhood of the current node;
detecting an intrusion affecting at least one suspect node of the neighborhood of the current node; and
establishing a group consensus affecting said at least one suspect node in a neighborhood of the at least one suspect node capable of making a decision relative to a change in status of the at least one suspect node according to a result of the group consensus;
wherein:
the act of discovering a neighborhood comprises receiving announcement messages coming from neighboring nodes of the current node, the announcement messages comprising at least one identifier of the neighboring node and at least one piece of information representative of a resilience level of the neighboring node to at least one type of intrusion, and assigning a group of resilience to the neighboring node, based on said at least one piece of information;

the act of establishing a group consensus counts a number of resilience groups having detected the intrusion and a total number of resilience groups represented in the neighborhood of the at least one suspect node;

the act of deciding to change the status of the at least one suspect node takes into account a comparison of the number of resilience groups having detected the intrusion with respect to the total number of resiliency groups represented in the neighborhood of the at least one suspect node.

12. A non-transitory computer-readable medium comprising instructions stored thereon for implementing a method for processing in a wireless communication network comprising a plurality of node equipment, when the instructions are executed by a processor of a node in the network, called a current node, wherein the method comprises acts implemented by the current node, the acts comprising:
discovering a neighborhood of the current node;
detecting an intrusion affecting at least one suspect node of the neighborhood of the current node;
establishing a group consensus affecting said at least one suspect node in a neighborhood of the at least one suspect node; and
deciding to change a status of the at least one suspect node based on a result of the group consensus;
wherein:
the act of discovering comprises receiving announcement messages coming from neighboring nodes of the current node, the announcement messages comprising at least one identifier of the neighboring node and at least one piece of information representative of a resilience level of the neighboring node to at least one type of intrusion, and assigning a group of resilience to the neighboring node, based on the at least one piece of information;

the act of establishing a group consensus counts a number of resilience groups having detected the intrusion and a total number of resilience groups represented in the neighborhood of the at least one suspect node;

the act of deciding to change the status of the at least one suspect node takes into account a comparison of the number of resilience groups having detected the intrusion with respect to the total number of resiliency groups represented in the neighborhood of the at least one suspect node.

* * * * *